US011917738B2

(12) United States Patent
Yao et al.

(10) Patent No.: US 11,917,738 B2
(45) Date of Patent: Feb. 27, 2024

(54) DUMMY LOAD CONTROL CIRCUIT AND LIGHTING DEVICE COMPATIBLE WITH TRIAC DIMMER

(71) Applicant: SAVANT TECHNOLOGIES LLC, East Cleveland, OH (US)

(72) Inventors: Pan Yao, Shanghai (CN); Weihu Chen, Shanghai (CN); Aijun Wang, Shanghai (CN); Yao Fu, Shanghai (CN); Zhiyong Wang, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/071,320

(22) Filed: Nov. 29, 2022

(65) Prior Publication Data

US 2023/0239986 A1 Jul. 27, 2023

(30) Foreign Application Priority Data

Dec. 31, 2021 (CN) ......................... 202123421242.2

(51) Int. Cl.
*H05B 45/30* (2020.01)
*H05B 45/3575* (2020.01)
*H05B 47/17* (2020.01)

(52) U.S. Cl.
CPC ......... *H05B 47/17* (2020.01); *H05B 45/3575* (2020.01)

(58) Field of Classification Search
CPC ........ H05B 45/38; H05B 45/46; H05B 45/58; H05B 45/305; H05B 45/325; H05B 45/375; H05B 45/3575
See application file for complete search history.

(56) References Cited

U.S. PATENT DOCUMENTS 8,810,143 B2 * 8/2014 Zhang ................ H05B 45/3575 315/210
9,113,516 B2 * 8/2015 Bordin ................. H05B 45/375
11,617,247 B2 * 3/2023 Takahashi ............ H05B 45/305 315/291
2012/0126714 A1 * 5/2012 Deppe ................ H05B 45/3575 315/192

(Continued)

FOREIGN PATENT DOCUMENTS

CN 103096606 B 12/2014
WO 2014013381 A1 1/2014

*Primary Examiner* — Tung X Le
(74) *Attorney, Agent, or Firm* — WOOD IP LLC

(57) ABSTRACT

The present disclosure provides a dummy load control circuit and a lighting device. The dummy load control circuit and a dummy load module are connected in parallel with a power supply input end and the dummy load control circuit includes a first switch circuit having a first switch control module so the first switch is controlled to be turned off when the power supply input end is connected to a triac dimmer, and turned on when the power supply input end is not connected to the triac dimmer, a second switch circuit having a second switch control module controlling on/off of the second switch, and a constant voltage source providing a constant voltage so the dummy load module is turned on when the first switch and the second switch are turned off, and turned off when the first switch and/or the second switch are turned on.

23 Claims, 7 Drawing Sheets

(56) References Cited

U.S. PATENT DOCUMENTS

2012/0230073 A1* 9/2012 Newman, Jr. .......... H05B 47/19 363/126
2013/0278159 A1* 10/2013 Del Carmen, Jr. .......................... H05B 45/3575 315/240
2015/0097484 A1* 4/2015 Lee ........................ H05B 45/48 315/121
2015/0181682 A1* 6/2015 Shet ..................... H05B 41/392 315/127

* cited by examiner

DUMMY LOAD CONTROL CIRCUIT AND LIGHTING DEVICE COMPATIBLE WITH TRIAC DIMMER

CROSS-REFERENCE TO RELATED APPLICATIONS

This application claims the benefit of Chinese Patent Application Serial Number 202123421242.2, filed Dec. 31, 2021, which is herein incorporated by reference.

DESCRIPTION

Field of Technology

The present application relates to a control circuit, and more particularly, to a dummy load control circuit compatible with a triac dimmer, and a lighting device comprising the same.

Background

Triac dimming is a current dimming method widely applied to incandescent lamps and LED lamps. During triac dimming, a triac dimmer is used. During a conduction period, the triac dimmer can adjust a voltage division ratio of internal resistors to change a conduction angle thereof, thereby changing the effective value of an output voltage, so as to achieve a dimming function. The advantages thereof lie in high working efficiency, stable performance and low dimming cost. In particular, the advantages of using a triac dimmer on an LED lamp are: low dimming cost, being compatible with existing circuits and no need to re-wire, thereby being suitable for renovation projects. In addition, when the triac dimmer is used, a current needs to continuously pass through the triac dimmer; however, a power supply input of a lighting system is a mains AC half-wave (that is, there is a voltage zero point), so that the power supply input of the lighting system cannot provide a sufficient working current for the triac dimmer. Therefore, an additional dummy load must be provided in the lighting system, so as to provide a sufficient maintained current for the triac dimmer.

In order to be compatible with a triac dimmer which may be present at a power supply input end, the current lighting system is usually provided with a dummy load on a lighting device side (e.g., an LED side), and the dummy load is connected to the power supply input end, as shown in FIG. 1. However, when there is no triac dimmer at the power supply input end, due to the connection of the dummy load, the lighting system will still have a high standby power when an LED at the lighting device side is turned off. Therefore, there is a need for the lighting system: to detect the presence or absence of a triac dimmer at a power supply input side, and to disconnect a dummy load from the power supply input side when the triac dimmer is absent, so as to reduce the standby power of the lighting system.

Currently, a circuit composed of a MCU, an amplifier, etc. has been developed to detect the presence or absence of a triac dimmer, so as to execute the on/off of a dummy load. However, the control circuit composed of a MCU, an amplifier, etc. has a complicated structure and high cost. Therefore, it is desired to develop a simple and low-cost control circuit, so as to automatically disconnect a dummy load from a power supply input end of a lighting system when the power supply input end is not connected to a triac dimmer, thereby reducing the standby power of the lighting system when a lamp is turned off; and so as to automatically connect the dummy load to the power supply input end of the lighting system when the power supply input end is connected to a triac dimmer, so as to provide a desired maintained current of the triac dimmer.

SUMMARY

The main purpose of the present application is to provide a dummy load control circuit compatible with a triac dimmer and a lighting device comprising the same, so as to at least solve the problems in the prior art that it is difficult to adaptively control the connection and disconnection between a dummy load and a power supply input end simply and at a low cost, and it is difficult to reduce the standby power of a lighting device caused by the dummy load when the power supply input end is not connected to a triac dimmer.

In order to achieve the described objects, according to one aspect of the present application, a dummy load control circuit compatible with a triac dimmer is provided, the dummy load control circuit and a dummy load module are connected in parallel with a power supply input end, the dummy load module has a dummy load control end, and the dummy load control circuit comprises: a first switch circuit, comprising a first switch and a first switch control module, wherein the first switch is controlled by the first switch control module so that the first switch is turned off when the power supply input end is connected to a triac dimmer, and is turned on when the power supply input end is not connected to the triac dimmer; a second switch circuit, comprising a second switch and a second switch control module controlling the on/off of the second switch; and a constant voltage source, providing a constant voltage to the dummy load control end, wherein the dummy load module is turned on when the first switch and the second switch are turned off, and is turned off when the first switch and/or the second switch are turned on.

In this way, the dummy load control end of the dummy load module is controlled by the first switch circuit, the second switch circuit, and the constant voltage source. The dummy load module is turned on when the first switch and the second switch are turned off, and is turned off when the first switch and/or the second switch are turned on, and the first switch is turned on when the power supply input end is not connected to the triac dimmer, and thus the dummy load module can be always turned off when the power supply input end is not connected to the triac dimmer. The first switch is turned off when the power supply input end is connected to the triac dimmer, and then in combination with the second switch, and thus when the power supply input end is connected to the triac dimmer, the dummy load module can be turned on only when an input voltage of an AC power supply input end is within a range from 0 to a first power supply voltage; therefore, when the power supply input end is connected to the triac dimmer, a current can pass through the dummy load in the dummy load module only when the input voltage of the AC power supply input end passes by the vicinity of a zero-crossing point.

Thus, a desired dummy load control circuit can be achieved only by using two simple and low-cost switch circuits and one constant voltage source, and the dummy load control circuit can adaptively control the dummy load in the dummy load module, such that when the power supply input end is connected to the triac dimmer, a current passes through the dummy load only when the input voltage of the AC power supply passes by the vicinity of a zero-crossing point, and the dummy load is always turned off when the power supply input end is not connected to the triac dimmer, thereby reducing the standby power of a lighting system caused by the dummy load when an LED is turned off while maintaining normal operation of the triac dimmer.

Further, according to an embodiment of the present application, the first switch control module comprises a capacitor, and a charge/discharge time of the capacitor is controlled by an input voltage of the power supply input end, and thus the on/off of the first switch is controlled.

In this way, by providing the capacitor in the first switch control module, the voltage of the capacitor can be controlled by controlling the charge/discharge time of the capacitor with the input voltage of the power supply input end, and the voltage of the capacitor can in turn control the on/off of the first switch, and the on/off of the first switch in turn relates to the on or off of the dummy load module. Therefore, by providing the capacitor, the on/off of the dummy load module can be adaptively controlled by using the input voltage of the power supply input end.

Further, according to an embodiment of the present application, the charge/discharge time of the capacitor is controlled by the input voltage of the power supply input end, so that a voltage at one end of the capacitor is less than a first turn-on voltage of the first switch when the power supply input end is connected to the triac dimmer, and is greater than the first turn-on voltage when the power supply input end is not connected to the triac dimmer, and thus the on/off of the first switch is controlled.

In this way, the voltage at one end of the capacitor is controlled by controlling the charge/discharge time of the capacitor with the input voltage of the power supply input end, thereby achieving desired on/off of the first switch. Specifically, by making the time period during which the voltage in the input voltage is 0 within a period T when the power supply input end is connected to the triac dimmer being longer than the time period during which the voltage in the input voltage is 0 within a period T when the power supply input end is not connected to the triac dimmer by at least a predetermined time interval (for example, about 2 ms), the charge/discharge time of the capacitor can be adaptively controlled by using different input voltages in cases where the power supply input end is connected to the triac dimmer and the power supply input end is not connected to the triac dimmer, so that the voltage at one end of the capacitor is less than the first turn-on voltage of the first switch when the power supply input end is connected to the triac dimmer, and is greater than the first turn-on voltage when the power supply input end is not connected to the triac dimmer, thereby achieving the desired on/off of the first switch.

Further, according to an embodiment of the present application, the first switch comprises a first control end, the first switch is connected to the dummy load control end, and the first switch control module is connected between the power supply input end and the first control end. The first switch is controlled by the first switch control module so that the first switch is turned off when the power supply input end is connected to the triac dimmer, and is turned on when the power supply input end is not connected to the triac dimmer comprises: the voltage of the first control end is controlled by the first switch control module, so that the voltage of the first control end is less than the first turn-on voltage of the first switch when the power supply input end is connected to the triac dimmer, and thus the first switch is turned off; and so that the voltage of the first control end is greater than the first turn-on voltage when the power supply input end is not connected to the triac dimmer, and thus the first switch is turned on.

In this way, as the first switch is connected to the dummy load control end (e.g., connected between the dummy load control end and the ground), the first switch can affect the on/off of the dummy load module. Moreover, the first switch control module is connected between the power supply input end and the first control end, and thus desired control of the first switch can be achieved via the first switch control module. By enabling the voltage of the first control end of the first switch to be always less than the first turn-on voltage of the first switch when the power supply input end is connected to the triac dimmer, and to be always greater than the first turn-on voltage when the power supply input end is not connected to the triac dimmer, the first switch can be turned off when the power supply input end is connected to the triac dimmer, and be turned on when the power supply input end is not connected to the triac dimmer, thereby affecting the on/off of the dummy load module.

Further, according to an embodiment of the present application, the first switch control module comprises a discharge module and a charge/discharge control module, wherein the discharge module comprises a charge/discharge control end, and the charge/discharge control module is connected between the power supply input end and the charge/discharge control end.

In this way, the voltage of the charge/discharge control end can be controlled by the input voltage of the power supply input end via the charge/discharge control module, thereby a discharge time of the discharge module can be controlled.

Further, according to an embodiment of the present application, the discharge module comprises the capacitor, a discharge resistor and a third switch, wherein one end of the capacitor is connected to the constant voltage source via a charge resistor to form a charge loop, the one end of the capacitor is connected to the third switch via the discharge resistor to form a discharge loop, and the one end of the capacitor is connected to the first control end of the first switch. The charge/discharge control end is a switch control end of the third switch.

In this way, the capacitor is connected to the constant voltage source via the charge resistor so as to form the charge loop, and the capacitor is connected to the third switch via the discharge resistor so as to form the discharge loop, and thus the on/off of the third switch determines whether the capacitor is in a charge state or in a discharge state. In addition, the charge/discharge control end is a switch control end of the third switch, and therefore by controlling the voltage of the charge/discharge control end through the charge/discharge control module, the on/off of the third switch can be controlled, and in turn, whether the capacitor is in a charge state or in a discharge state can be controlled, and the charge or discharge time of the capacitor can be controlled, thereby on/off control of the first switch can be achieved. Accordingly, the capacitor and the charge resistor which form the charge loop may be regarded as a charge module in the first switch control module.

Further, according to an embodiment of the present application, the voltage of the first control end is controlled by the first switch control module, so that the voltage of the first control end is less than the first turn-on voltage when the power supply input end is connected to the triac dimmer, and the voltage of the first control end is greater than the first turn-on voltage when the power supply input end is not connected to the triac dimmer comprises: controlling, using the input voltage of the power input end, the voltage of the charge/discharge control end through the charge/discharge control module, so as to control the on/off of the third switch, thereby controlling the charge/discharge time of the capacitor, so that the voltage at the one end of the capacitor is less than the first turn-on voltage when the power supply input end is connected to the triac dimmer, and is greater than the first turn-on voltage when the power supply input end is not connected to the triac dimmer. The capacitor is charged when the third switch is turned off, and discharges when the third switch is turned on.

In this way, the control of the voltage of the first control end is converted into the control of the voltage of the capacitor, and when the charge/discharge rate is fixed, the voltage of the capacitor depends on the charge/discharge time, and the charge/discharge time in turn depends on the on/off time of the third switch, and therefore the control of the voltage of the capacitor is further converted into the control of the on/off of the third switch. As the on/off of the third switch depends on the voltage of the charge/discharge control end, the control of the voltage of the first control end is converted into adaptive control of the voltage of the charge/discharge control end. By adaptively controlling the voltage of the charge/discharge control end with the input voltage of the power supply input end, the voltage of the first control end can be less than the first turn-on voltage when the power supply input end is connected to the triac dimmer, and can be greater than the first turn-on voltage when the power supply input end is not connected to the triac dimmer.

Further, according to an embodiment of the present application, the charge/discharge control module comprises a fourth switch and a fourth switch control module, wherein the fourth switch comprises a fourth control end, the fourth switch is connected between the charge/discharge control end and the ground, and the fourth switch control module is connected between the power supply input end and the fourth control end, to control the on/off of the fourth switch.

In this way, by providing the fourth switch, adaptive control of the third switch can be achieved through adaptive controlling the fourth switch by the input voltage of the power supply input end.

Further, according to an embodiment of the present application, controlling the voltage of the charge/discharge control end through the charge/discharge control module, so as to control the on/off of the third switch, thereby controlling the charge/discharge time of the capacitor comprises: controlling, by the fourth switch control module, the on/off of the fourth switch, so as to control the voltage of the charge/discharge control end, thereby controlling the on/off of the third switch. The on/off state of the third switch is opposite to the on/off state of the fourth switch.

In this way, when the fourth switch is turned off, the charge/discharge control end is at a high level, the third switch is turned on, and the capacitor discharges; and when the fourth switch is turned on, the charge/discharge control end is at a low level, the third switch is turned off, and the capacitor is charged. Therefore, by adaptively controlling the voltage of the fourth control end of the fourth switch, adaptive control of charging or discharging of the capacitor can be achieved, so that the voltage of the first control end is less than the first turn-on voltage when the power supply input end is connected to the triac dimmer, and is greater than the first turn-on voltage when the power supply input end is not connected to the triac dimmer.

Further, according to an embodiment of the present application, the fourth switch control module comprises a first voltage division resistor and a second voltage division resistor connected in series, wherein the first voltage division resistor is connected to the power supply input end; and wherein the fourth control end is connected to a first node between the first voltage division resistor and the second voltage division resistor.

In this way, by providing the first voltage division resistor and the second voltage division resistor which are connected in series to the power supply input end, the adaptive control on the voltage of the fourth control end (i.e., the voltage at the first node) of the fourth switch can be achieved using the input voltage of the power supply input end.

Further, according to an embodiment of the present application, controlling, using the input voltage of the power input end, the voltage of the charge/discharge control end through the charge/discharge control module, so as to control on/off of the third switch, thereby controlling the charge/discharge time of the capacitor, so that the voltage at the one end of the capacitor is less than the first turn-on voltage when the power supply input end is connected to the triac dimmer, and is greater than the first turn-on voltage when the power supply input end is not connected to the triac dimmer comprises: in response to the input voltage of the power supply input end after rectification being an AC half-wave with a period of T when the power supply input end is not connected to the triac dimmer, within the period T: the capacitor is charged by the constant voltage source when the third switch is turned off, the capacitor discharges via the discharge resistor when the third switch is turned on, and the voltage at the one end of the capacitor is still greater than the first turn-on voltage after discharging; and in response to the input voltage of the power supply input end after rectification being a phase-cut AC half-wave with a period of T when the power supply input end is connected to the triac dimmer, within the period T: the capacitor is charged by the constant voltage source when the third switch is turned off, the capacitor discharges via the discharge resistor when the third switch is turned on, and the voltage at the one end of the capacitor is still less than the first turn-on voltage after charging.

In this way, in response to the input voltage of the power supply input end after rectification being an AC half-wave with a period of T when the power supply input end is not connected to the triac dimmer, and the input voltage of the power supply input end after rectification being a phase-cut AC half-wave with a period of T when the power supply input end is connected to the triac dimmer, using the described charge/discharge control module, the on-off time of the third switch can be adaptively controlled, and then the charge or discharge time of the capacitor can be controlled, so that the voltage of the first control end is less than the first turn-on voltage when the power supply input end is connected to the triac dimmer, and is greater than the first turn-on voltage when the power supply input end is not connected to the triac dimmer.

Further, according to an embodiment of the present application, the fourth switch is turned on when the voltage of the fourth control end is greater than a fourth turn-on voltage of the fourth switch, and is turned off when the voltage of the fourth control end is less than the fourth turn-on voltage; and the time period during which the voltage at the first node is less than the fourth turn-on voltage corresponds to a turning-on time period of the third switch, and the time period during which the voltage at the first node is greater than the fourth turn-on voltage corresponds to a turning-off time period of the third switch.

In this way, by means of suitable resistance values of the first voltage division resistor and the second voltage division resistor, a suitable time period during which the voltage at the first node is less than the fourth turn-on voltage and a suitable time period during which the voltage at the first node is greater than the fourth turn-on voltage can be adaptively achieved on the basis of the input voltage, thereby suitable discharge time and charge time of the capacitor can be achieved, so that the voltage of the first control end (the voltage at a high-potential end of the capacitor) is less than the first turn-on voltage when the power supply input end is connected to the triac dimmer, and is greater than the first turn-on voltage when the power supply input end is not connected to the triac dimmer.

Further, according to an embodiment of the present application, the second switch comprises a second control end, the second switch is connected between the dummy load control end and the ground, and the second switch control module is connected between the power supply input end and the second control end.

In this way, by enabling the second switch to be connected between the dummy load control end and the ground, the dummy load module can be turned off when the second switch is turned on. By using the second switch control module, desired control of the second switch can be achieved.

Further, according to an embodiment of the present application, the second switch is turned on when the voltage of the second control end is greater than a second turn-on voltage of the second switch, and is turned off when the voltage of the second control end is less than the second turn-on voltage, and the second switch control module enables the voltage of the second control end to be at a predetermined ratio to the input voltage of the power supply input end.

In this way, using the second switch control module and the input voltage of the power supply input end, adaptive control on the voltage of the second control end can be achieved, thereby achieving adaptive control on the second switch.

Further, according to an embodiment of the present application, the second switch control module comprises a third voltage division resistor and a fourth voltage division resistor connected in series, wherein the third voltage division resistor is connected to the power supply input end, and wherein the second control end is connected to a second node between the third voltage division resistor and the fourth voltage division resistor, such that the voltage of the second control end is at the predetermined ratio to the input voltage of the power supply input end.

In this way, by providing the third voltage division resistor and the fourth voltage division resistor which are connected in series to the power supply input end, the second switch control module can be implemented, and thus adaptive control of the second switch can be achieved by using the input voltage of the power supply input end.

Further, according to an embodiment of the present application, the first switch is an MOS transistor, and the second switch, the third switch and the fourth switch are triodes.

In this way, desired first switch circuit and second switch circuit can be achieved by merely using one MOS transistor and three triodes, and in combination with a capacitor and resistors, thereby achieving a desired dummy load control circuit. Therefore, compared with the existing dummy load control circuit, the dummy load control circuit according to the present application has a simpler circuit structure and a lower cost.

Further, according to an embodiment of the present application, the dummy load control end is at the constant voltage when the first switch and the second switch are turned off, so that the dummy load module is turned on; and the dummy load control end is grounded when the first switch and/or the second switch are turned on, so that the dummy load module is turned off.

In this way, the dummy load module can be turned on when the first switch and the second switch are turned off, and can be turned off when the first switch and/or the second switch are turned on, so that no current flows through the dummy load in the dummy load module when the power supply input end is not connected to the triac dimmer, and a current flows through the dummy load only when the input voltage of the power supply input end passes by the vicinity of a zero-crossing point when the power supply input end is connected to the triac dimmer.

According to another aspect of the present application, a lighting device compatible with a triac dimmer is provided, comprising: the described dummy load control circuit; a dummy load module, connected to a power supply input end and having a dummy load control end; and a light-emitting module, the light-emitting module and the dummy load module being connected in parallel with the power supply input end and the light-emitting module emitting light according to an input voltage of the power supply input end; wherein the dummy load control circuit is connected between the power supply input end and the dummy load control end, so that: the dummy load module is turned on when the power supply input end is connected to a triac dimmer and the input voltage of the power supply input end is between 0 and a predetermined first power supply voltage, and the dummy load module is turned off when the power supply input end is not connected to the triac dimmer.

In this way, the present application can provide a desired lighting device comprising a dummy load control circuit and a dummy load module, which can provide a desired maintained current for the triac dimmer when a power supply input end is connected to the triac dimmer, and can reduce the standby power of the lighting device caused by the dummy load when an LED is turned off by disconnecting the dummy load from the power supply input end, when the power supply input end is not connected to the triac dimmer.

In the embodiments of the present application, a dummy load control circuit compatible with a triac dimmer and a lighting device comprising the same are provided. A dummy load module having a dummy load control end and the dummy load control circuit are connected in parallel to a power supply input end, and the dummy load control circuit comprises: a first switch circuit, comprising a first switch and a first switch control module, wherein the first switch is controlled by the first switch control module so that the first switch is turned off when the power supply input end is connected to a triac dimmer, and is turned on when the power supply input end is not connected to the triac dimmer; a second switch circuit, comprising a second switch and a second switch control module controlling the on/off of the second switch; and a constant voltage source, providing a constant voltage to the dummy load control end, wherein the dummy load module is turned on when the first switch and the second switch are turned off, and is turned off when the first switch and/or the second switch are turned on, so as to at least solve the problems in the prior art that it is difficult to adaptively control the connection and disconnection between a dummy load and a power supply input end simply and at a low cost, and it is difficult to reduce the standby power of a lighting device caused by the dummy load when the power supply input end is not connected to a triac dimmer, thereby achieving the effect of reducing the standby power of the lighting device caused by the dummy load by adaptively controlling the connection and disconnection between the dummy load and the power supply input end simply and at a low cost.

BRIEF DESCRIPTION OF THE DRAWINGS

The drawings of the description, constituting a part of the present application, are used for providing further understanding of the present application, and the illustrative embodiments of the present application and illustrations thereof are used to explain the present application, rather than constitute inappropriate limitation on the present application. In the drawings.

DETAILED DESCRIPTION

It is to be illustrated that embodiments and the features in the embodiments of the present application can be combined with one another without conflicts. Hereinafter, the present application will be described in detail with reference to the accompanying drawings in combination with the embodiments.

It is to be noted that unless otherwise indicated, all technical and scientific terms used in the present application have the same meaning as those commonly understood by one of ordinary skill in the art to which the present application belongs.

In the present application, unless specified to the contrary, the directional terms such as "upper", "lower", "top", and "bottom" are generally used for the directions shown in the figures, or for the components themselves in vertical, perpendicular, or gravity directions; and likewise, for ease of understanding and description, "internal, external" refer to internal and external relative to the outline of each component itself, but the described directional terms are not used to limit the present application.

Figure 1:
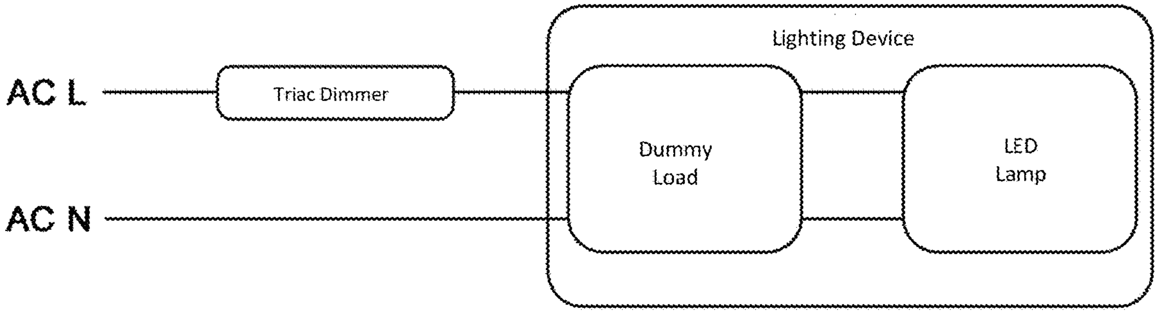
FIG. 1 illustrates a schematic diagram of circuit connection of a lighting device comprising a dummy load in the prior art.

FIG. 1 illustrates a schematic diagram of circuit connection of a lighting device comprising a dummy load in the prior art. As shown in FIG. 1, a lighting device 100' comprises a dummy load R0 and an LED lamp 300. An AC power supply input end is connected to a triac dimmer U1. When the lighting device 100' is connected to the power supply input end, an AC power supply is supplied to the dummy load R0 and the LED lamp 300 after passing through the triac dimmer U1. However, in the lighting device 100' in FIG. 1, the dummy load R0 is always connected to the power supply input end. Therefore, when the power supply input end is not connected to the triac dimmer U1 (that is, the triac dimmer U1 in FIG. 1 does not exist), even if a switch at the LED lamp 300 is turned off, the dummy load R0 still forms a loop with the AC power supply to generate a current, resulting in a high standby power of the lighting device.

Figure 2:
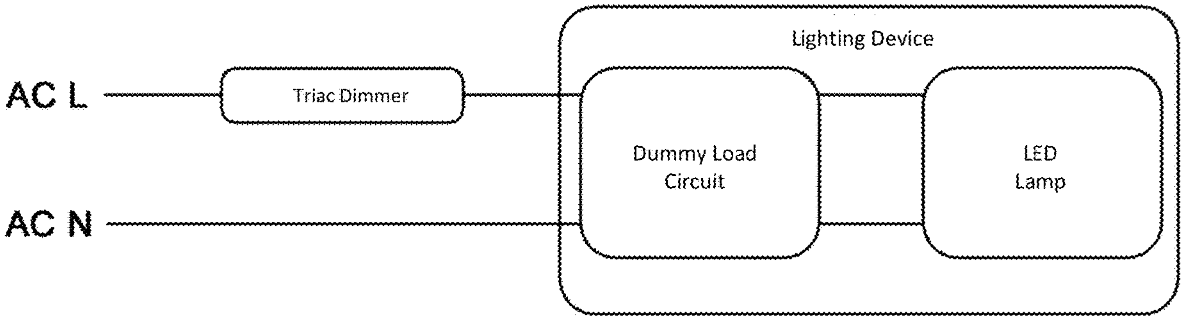
FIG. 2 illustrates a schematic diagram of circuit connection of a lighting device comprising a dummy load circuit according to embodiments of the present application.

In view of this, the present application considers and proposes an adaptive dummy load control circuit compatible with a triac dimmer, an adaptive dummy load circuit comprising the same, and an adaptive lighting device comprising the adaptive dummy load circuit. FIG. 2 illustrates a schematic diagram of circuit connection of a lighting device comprising a dummy load circuit according to embodiments of the present application. As shown in FIG. 2, a lighting device 100 comprises a dummy load circuit 200 and an LED lamp 300. The dummy load circuit 200 comprises a dummy load module and a dummy load control circuit (not shown) controlling the on/off thereof. The lighting device 100 shown in FIG. 2 is similar to the lighting device 100' shown in FIG. 1, but the differences lie in: in response to an input voltage after rectification being a phase-cut AC half-wave with a period of T when the power supply input end is connected to the triac dimmer, and the input voltage of the power supply input end after rectification being an AC half-wave with a period of T when the power supply input end is not connected to the triac dimmer (the time period during which the voltage is 0 in the phase-cut AC half-wave is longer than the time period during which the voltage is 0 in the AC half-wave by at least a predetermined time interval, for example, 2 ms, within a period of T), when the power supply input end is connected to or is not connected to a triac dimmer U1, the dummy load circuit 200 in the lighting device 100 enables that a current passes through a dummy load in the dummy load circuit 200 only when the input voltage of the power supply input end is near a zero-crossing point (namely, when the input voltage changes between 0 and a first power supply voltage Vs1, the first power supply voltage Vs1 being regarded as a predetermined threshold voltage close to 0) when the power supply input end is connected to the triac dimmer, and enables that the dummy load in the dummy load circuit 200 is automatically disconnected from the power supply input end when the power supply input end is not connected to the triac dimmer.

Specifically, in the present application, using different waveforms of input voltages presented when the power supply input end connected to a lighting device is connected to the triac dimmer and when the power supply input end is not connected to the triac dimmer, the dummy load circuit in the lighting device or a dummy load control circuit therein can achieve adaptive control of the on/off of the dummy load module in the dummy load circuit when the power supply input end is connected to or is not connected to the triac dimmer, thereby achieving adaptive control on the dummy load.

Figure 3:
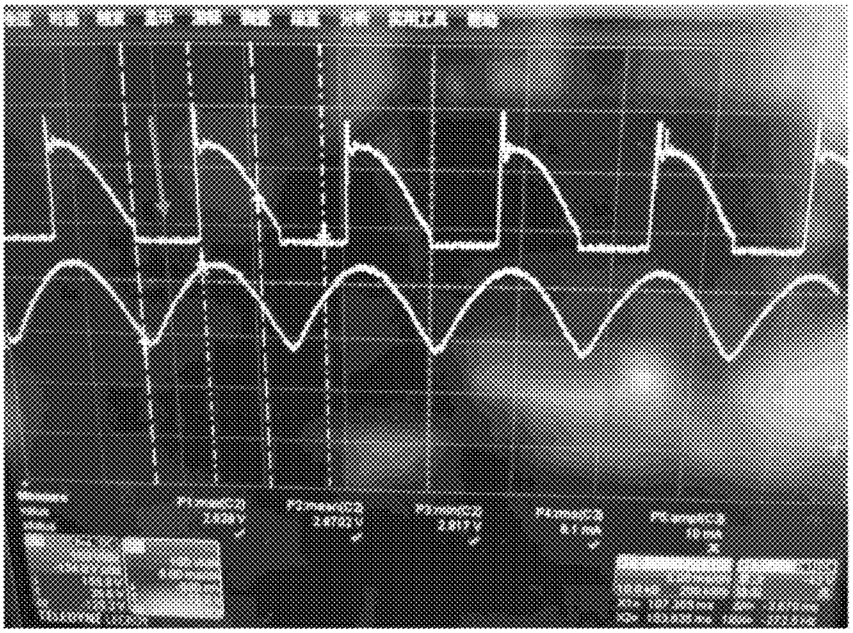
FIG. 3 illustrates waveforms of an input voltage of a power supply input end when the power supply input end is connected to a triac dimmer and when the power supply input end is not connected to a triac dimmer, respectively.

FIG. 3 illustrates waveforms of an input voltage of a power supply input end when the power supply input end is connected to a triac dimmer and when the power supply input end is not connected to a triac dimmer, respectively. As shown in FIG. 3, when the power supply input end is not connected to the triac dimmer U1, the input voltage of the power supply input end after rectification is presented as an AC half-wave or steamed bread wave; and when the power supply input end is connected to the triac dimmer U1, the input voltage of the power supply input end after rectification is presented as a phase-cut AC half-wave. The phase-cut AC half-wave has the same period T as the AC half-wave, while the phase-cut AC half-wave can be regarded as a waveform obtained by truncating a part of the voltage waveform of the AC half-wave to zero. That is, within the period T, the time period during which the voltage is 0 in the phase-cut alternating current half-wave when the power supply input end is connected to the triac dimmer U1 is longer than the time period during which the voltage is 0 in the AC half-wave when the power supply input end is not connected to the triac dimmer by at least a predetermined time interval, as shown by the arrow in FIG. 3. When the cut phase is 45 degrees (that is, the voltage in the first ¼ period is truncated to zero), the zero-voltage part in the phase-cut AC half-wave lasts about 1 to 2 ms. In the present application, the on or off of the dummy load module in the dummy load circuit 200 is achieved adaptively by using the time difference of 1 to 2 ms existing in two voltage waveforms in two cases where the power supply input end is connected to or not connected to the triac dimmer U1.

Further, in the present application, the dummy load control circuit is provided with a charge/discharge loop, which comprises a capacitor C1, connected to the power supply input end. The time difference of 1 to 2 ms is used in combination with the charge/discharge loop to change the voltage of the capacitor C1, and then the voltage is used to control the on and off of the dummy load.

Specifically, a second power supply voltage Vs2 and the dummy load control circuit are provided, such that within one period T of the input voltage, the capacitor C1 of the dummy load control circuit continuously discharges when the input voltage is in a range from 0 to the second power supply voltage Vs2, and the capacitor C1 of the dummy load control circuit is continuously charged when the input voltage is out of the range from 0 to the second power supply voltage Vs2.

Further, the charge/discharge rate of the capacitor C1 may be set such that within the period T: when the time period during which the input voltage is in the range of 0 to the second power supply voltage Vs2 is less than a predetermined time period, the voltage of the capacitor C1 is still greater than a certain predetermined voltage after the capacitor C1 discharges within the time period during which the input voltage is in the range from 0 to the second power supply voltage Vs2; and when the time period during which the input voltage is in the range from 0 to the second power supply voltage Vs2 is greater than the predetermined time period, the voltage of the capacitor C1 is still less than the predetermined voltage after the capacitor C1 is charged in the time period during which the input voltage is out of the range from 0 to the second power supply voltage Vs2.

As the time period during which the voltage is 0 in the phase-cut AC half-wave is longer than the time period during which the voltage is 0 in the AC half-wave by at least a predetermined time interval within a period of T, the situation in which the time period during which the input voltage is in the range from 0 to the second power supply voltage Vs2 is less than the predetermined time period can be made to correspond to the situation in which the power supply input end is not connected to the triac dimmer U1, and therefore the voltage of the capacitor C1 being greater than the predetermined voltage means that the power supply input end is not connected to the triac dimmer U1. Similarly, the situation in which the time period during which the input voltage is in the range from 0 to the second power supply voltage is greater than the predetermined time period can be made to correspond to the situation in which the power supply input end is connected to the triac dimmer U1, and therefore the voltage of the capacitor C1 being less than the predetermined voltage means that the power supply input end is connected to the triac dimmer U1.

Figure 4:
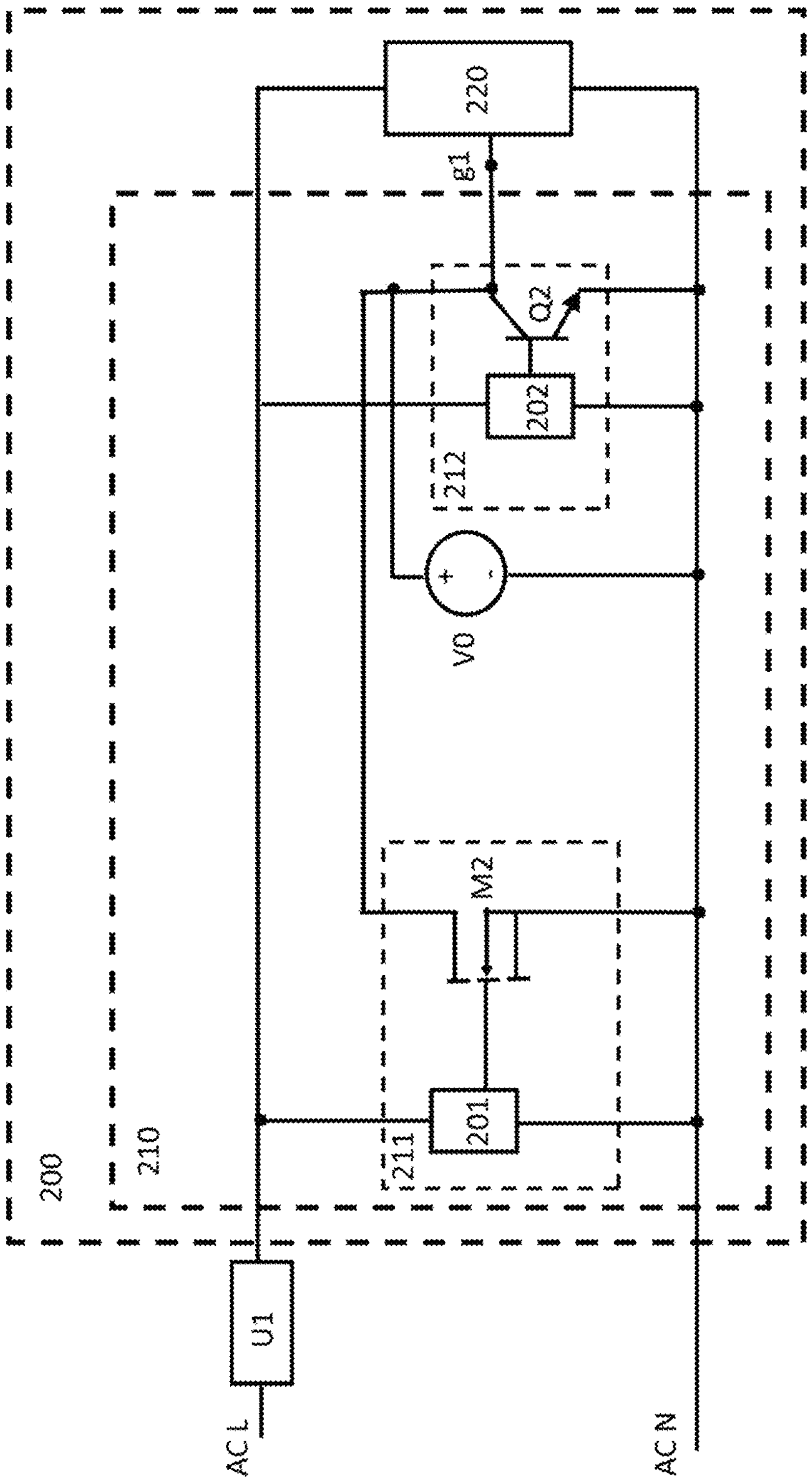
FIG. 4 is a circuit principle diagram of a dummy load control circuit and a dummy load circuit compatible with a triac dimmer according to embodiments of the present application.

Next, the dummy load control circuit and the dummy load circuit using the described principle according to embodiment of the present applications are explained with reference to FIG. 4. FIG. 4 is a circuit principle diagram of a dummy load control circuit and a dummy load circuit compatible with a triac dimmer according to embodiments of the present application. FIG. 4 shows a dummy load control circuit 210 compatible with a triac dimmer, and a dummy load circuit 200 comprising the same. The dummy load circuit 200 comprises the dummy load control circuit 210 and a dummy load module 220, wherein the dummy load control circuit 210 and the dummy load module 220 are connected in parallel with an AC power supply input end. The dummy load module 220 comprises a resistor serving as a dummy load and has a dummy load control end g1 for controlling the on/off of the dummy load module 220.

In order to achieve the object of the present application, as shown in FIG. 4, the dummy load control circuit 210 may comprise: a first switch circuit 211, comprising a first switch control module 201 and a first switch M2, wherein the first switch M2 is controlled by the first switch control module so that the first switch M2 is turned off when the power supply input end is connected to a triac dimmer, and is turned on when the power supply input end is not connected to the triac dimmer; a second switch circuit 212, comprising a second switch Q2 and a second switch control module 202 controlling the on/off of the second switch Q2; and a constant voltage source V0, providing a constant voltage V' to the dummy load control end g1, wherein the dummy load module 220 is turned on when the first switch M2 and the second switch Q2 are turned off, and is turned off when the first switch and/or the second switch are turned on.

Using the described dummy load control circuit 210, the dummy load control end g1 of the dummy load module 220 is controlled by the first switch circuit 211, the second switch circuit 212 and the constant voltage source V0. When the first switch M2 and the second switch Q2 are turned off, the dummy load control end g1 is turned on due to being at a high level, and when the first switch M2 and/or the second switch Q2 are turned on, the dummy load control end g1 is turned off due to being at a low level. Thus, adaptive control of the dummy load module 220 can be achieved, so that when the power supply input end is connected to the triac dimmer, a current passes through the dummy load module 220 only when an input voltage of the AC power supply input end passes by the vicinity of a zero-crossing point; and when the power supply input end is not connected to the triac dimmer, the dummy load module 220 remains disconnected from the power supply input end.

Further, the first switch M2 comprises a first control end, the first switch M2 is connected to the dummy load control end g1 (in the figure, connected between the dummy load control end g1 and the ground), and the first switch control module 201 is connected between the power supply input end and the first control end. The second switch Q2 comprises a second control end, the second switch Q2 is connected to the dummy load control end g1 (in the figure, connected between the dummy load control end g1 and the ground), and the second switch control module 202 is connected between the power supply input end and the second control end.

Further, the first switch M2 is turned off when the voltage of the first control end is less than a first turn-on voltage V1 of the first switch M2, and is turned on when the voltage of the first control end is greater than the first turn-on voltage V1. Thus, the voltage of the first control end is controlled by the first switch control module, so that the voltage of the first control end is less than the first turn-on voltage V1 when the power supply input end is connected to the triac dimmer, thereby the first switch M2 is turned off, and the voltage of the first control end is greater than the first turn-on voltage V1 when the power supply input end is not connected to the triac dimmer, thereby the first switch M2 is turned on.

In the present application, for example, the first switch M2 may be a triode or an MOS transistor, preferably an NMOS transistor. Accordingly, the first turn-on voltage V1 may be, for example, 1 V or 2.5 V.

Figure 5:
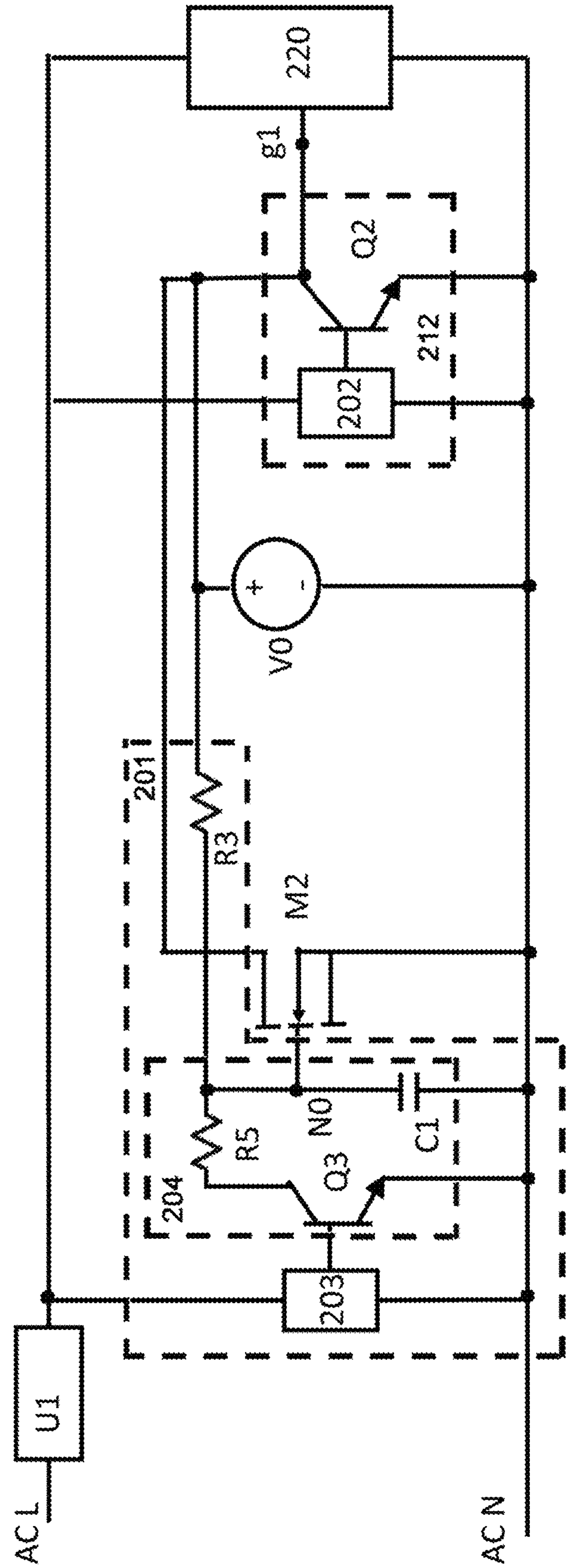
FIG. 5 is a schematic diagram of a simplified circuit structure of a dummy load control circuit and a dummy load circuit compatible with a triac dimmer according to embodiments of the present application.
Figure 6:
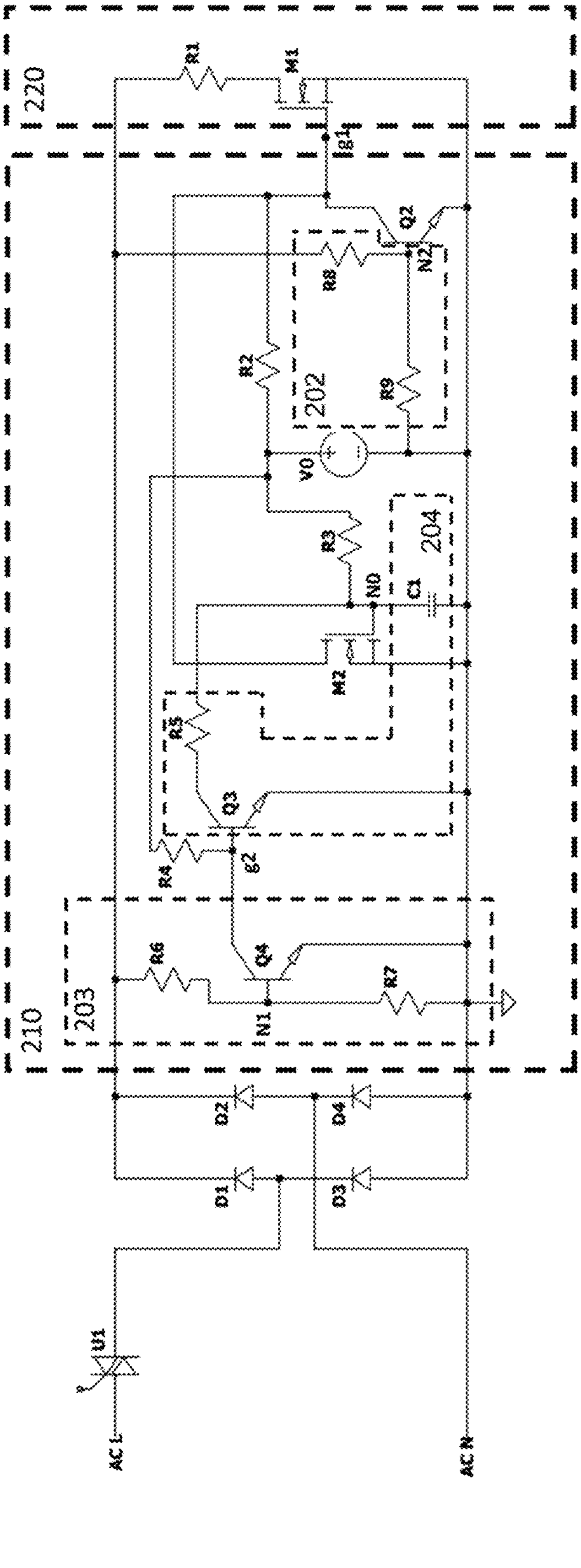
FIG. 6 is a schematic diagram of a circuit structure of a dummy load control circuit and a dummy load circuit compatible with a triac dimmer according to embodiments of the present application.

Further, the first switch control module 201 may comprise a charge module, a discharge module, and a charge/discharge control module. The charge module, the discharge module and the charge/discharge control module are shown in FIGS. 5 and 6. FIG. 5 is a schematic diagram of a simplified circuit structure of a dummy load control circuit and a dummy load circuit compatible with a triac dimmer according to embodiments of the present application. FIG. 6 is a schematic diagram of a circuit structure of a dummy load control circuit and a dummy load circuit compatible with a triac dimmer according to embodiments of the present application. In particular, FIG. 5 shows an exemplary simplified circuit structure of the dummy load circuit 200 as shown in FIG. 4. FIG. 6 shows an exemplary detailed circuit structure of the dummy load circuit 200 as shown in FIG. 4.

As shown in FIG. 5, the first switch control module 201 comprises a capacitor C1, and the on/off of the first switch M2 depends on the voltage at one end NO of the capacitor C1. The input voltage of the power supply input end after rectification is an AC half-wave with a period of T when the power supply input end is not connected to a triac dimmer, the input voltage after rectification is a phase-cut AC half-wave with a period of T when the power supply input end is connected to the triac dimmer, and the time period during which the voltage is 0 in the phase-cut AC half-wave is longer than the time period during which the voltage is 0 in the AC half-wave by at least a predetermined time interval within the period of T; therefore, the charge/discharge time of the capacitor C1 can be controlled by using the input voltage of the power supply input end, so that the voltage at one end NO of the capacitor C1 is less than the first turn-on voltage V1 of the first switch M2 when the power supply input end is connected to the triac dimmer, and is greater than the first turn-on voltage V1 when the power supply input end is not connected to the triac dimmer.

Thus, the voltage of the capacitor C1 can be adaptively changed by using the time difference of 1 to 2 ms existing in the waveforms of two input voltages in two cases where the power supply input end is connected to or not connected to the triac dimmer U1, in combination with the charge/discharge loop, thereby adaptively controlling the on or off of the dummy load by using this voltage of the capacitor C1.

Further, the first switch control module 201 in FIG. 4 may comprise a charge/discharge control module 203 and a discharge module 204, and the capacitor C1 may be provided in the discharge module 204, as shown in FIGS. 5 and 6. Specifically, as shown in FIG. 6, the discharge module 204 comprises a capacitor C1 and has a charge/discharge control end g2, wherein the charge/discharge control module 203 is connected between the power supply input end and the charge/discharge control end g2 and can control the charge/discharge time of the capacitor C1, so as to control the voltage at one end N0 of the capacitor C1. In addition, one end N0 of the capacitor C1 is connected to the constant voltage source V0 via a charge resistor R3 to form a charge loop, and the one end N0 of the capacitor C1 is connected to the first control end of the first switch M2. Accordingly, the capacitor C1 and the charge resistor R3 constitute the charge module in the first switch control module 201.

In this way, the voltage at one end N0 of the capacitor C1 is the voltage of the first control end of the first switch M2.

Further, the input voltage of the power supply input end is used to control the voltage of the charge/discharge control end g2 through the charge/discharge control module 203, so as to control the charge/discharge time of the capacitor C1 in the discharge module 204, so that the voltage at one end N0 of the capacitor C1 is less than the first turn-on voltage V1 when the power supply input end is connected to the triac dimmer, and is greater than the first turn-on voltage V1 when the power supply input end is not connected to the triac dimmer, and thus the first switch M2 can be turned off when the power supply input end is connected to the triac dimmer, and can be turned on when the power supply input end is not connected to the triac dimmer.

The discharge module 204 can further comprise a discharge resistor R5 and a third switch Q3. One end N0 of the capacitor C1 is connected to the third switch Q3 via the discharge resistor R5, so as to form a discharge loop. The charge/discharge control end g2 is a switch control end of the third switch Q3.

Therefore, the capacitor C1 discharges via the discharge loop when the third switch Q3 is turned on, and the capacitor C1 is charged via the charge loop when the third switch Q3 is turned off. In the present application, for example, the third switch Q3 may be a triode, which is turned on when the voltage of a third control end (i.e., a gate) is greater than a third turn-on voltage V3 of the third switch Q3, and is turned off when the voltage of the third control end is less than the third turn-on voltage V3. The third turn-on voltage V3 may be, for example, 0.7 V.

That is, using the input voltage of the power supply input end, the voltage of the charge/discharge control end g2 can be controlled through the charge/discharge control module 203, and thus the on/off of the third switch Q3 can be controlled, and in turn the charge/discharge time of the capacitor C1 can be controlled. Moreover, by adaptively controlling the charge/discharge time of the capacitor C1 under different cases of a triac dimmer being connected and not connected, the voltage at one end NO of the capacitor C1 can be less than the first turn-on voltage V1 when the power supply input end is connected to the triac dimmer, and can be greater than the first turn-on voltage V1 when the power supply input end is not connected to the triac dimmer.

Further, the charge/discharge control module 203 may comprise a fourth switch Q4 and a fourth switch control module. The fourth switch Q4 is connected between the charge/discharge control end g2 and the ground; the fourth switch Q4 comprises a fourth control end, and the fourth switch control module is connected between the power supply input end and the fourth control end so as to control the on/off of the fourth switch Q4.

Further, the charge/discharge control end g2 may be connected to the constant voltage source V0 via a drive resistor R4. The constant voltage source V0 may output a constant voltage V' with a magnitude in the range of 10 V to 20 V, for example.

In this way, the on/off of the fourth switch Q4 may determine the voltage of the charge/discharge control end g2, so as to control the on/off of the third switch Q3. When the fourth switch Q4 is turned off, the charge/discharge control end g2 is at a high level, so that the third switch Q3 is turned on; and when the fourth switch Q4 is turned on, the charge/discharge control end g2 is at a low level, so that the third switch Q3 is turned off. That is, the on/off state of the third switch Q3 depends on the on/off state of the fourth switch Q4, and the on/off state of the third switch Q3 is opposite to the on/off state of the fourth switch Q4.

The fourth switch control module can be composed of a first voltage division resistor R6 and a second voltage division resistor R7 connected in series, as shown in FIG. 6. The first voltage division resistor R6 and the second voltage division resistor R7 are connected in series with the power supply input end, and the fourth control end of the fourth switch Q4 is connected to a first node N1 between the first voltage division resistor R6 and the second voltage division resistor R7. Therefore, the voltage at the first node N1 (i.e., the voltage of the fourth control end) is at a certain predetermined ratio to the input voltage of the power supply input end.

In the present application, the fourth switch Q4 may be a triode or an MOS transistor. For example, the fourth switch Q4 may be a triode same as the third switch Q3. The fourth switch Q4 is turned on when the voltage of the fourth control end (i.e., the gate) is greater than a fourth turn-on voltage V4 of the fourth switch Q4, and is turned off when the voltage of the fourth control end is less than the fourth turn-on voltage V4.

Thus, after the first voltage division resistor R6 and the second voltage division resistor R7 are set, the divided voltage borne by the first node N1 with respect to the input voltage is determined. Therefore, the voltage at the first node N1 can be determined according to the input voltage of the power supply input end, and then the on/off state of the fourth switch Q4 can be determined, and then the on/off state of the third switch Q3 can be determined, such that whether the capacitor C1 is in a charge state or a discharge state and corresponding charge time or discharge time can be determined, and then whether the voltage at one end NO of the capacitor C1 is at a higher level or a lower level compared with the first turn-on voltage can be determined, and thus the on/off state of the first switch M2 can be determined.

Therefore, in response to the input voltage of the power supply input end after rectification being an AC half-wave with a period of T when the power supply input end is not connected to a triac dimmer, the voltage dividing proportion at the first node N1 may be appropriately set according to the characteristics of the input voltage, so that the turn-off time of the fourth switch Q4 may be adaptively controlled using the input voltage, and in turn, the turn-on time of the third switch Q3 may be adaptively controlled, so that: within one period T, the capacitor C1 is charged by the constant voltage source V0 when the third switch Q3 is turned off, the capacitor C1 discharges via the discharge resistor R5 when the third switch Q3 is turned on, and the voltage at one end NO of the capacitor C1 is still greater than the first turn-on voltage V1 after discharging. Therefore, when the power supply input end is not connected to the triac dimmer, the first switch M2 maintains a turn-on state.

Moreover, in response to the input voltage of the power supply input end after rectification being a phase-cut AC half-wave with a period of T when the power supply input end is connected to the triac dimmer, the turn-on time of the fourth switch Q4 can be adaptively controlled according to the set voltage dividing proportion at the first node N1, and in turn the turn-off time of the third switch Q3 can be adaptively controlled, so that: within one period T, the capacitor C1 is charged by the constant voltage source V0 when the third switch Q3 is turned off, the capacitor C1 discharges via the discharge resistor R5 when the third switch Q3 is turned on, and the voltage at one end NO of the capacitor C1 is still less than the first turn-on voltage V1 after being charged. Therefore, when the power supply input end is connected to the triac dimmer, the first switch M2 maintains a turn-off state.

That is, the divided voltage at the first node N1, which is at a certain predetermined ratio to the input voltage, may be set based on the following considerations: within one period, the time period during which the divided voltage at the first node N1 is less than the fourth turn-on voltage V4 corresponds to the turning-on time period of the third switch Q3, and therefore corresponds to the discharging time period of the capacitor C1; and the time period during which the divided voltage at the first node N1 is greater than the fourth turn-on voltage V4 corresponds to the turning-off time period of the third switch Q3, and therefore corresponds to the charging time period of the capacitor C1.

Similar to the fourth switch Q4, the second switch Q2 is turned on when the voltage of the second control end is greater than a second turn-on voltage V2 of the second switch Q2, and is turned off when the voltage of the second control end is less than the second turn-on voltage V2. In the present application, the second switch Q2 may be a triode or an MOS transistor. For example, the second switch Q2 may be a triode same as the third switch Q3 and the fourth switch Q4.

The second switch control module is connected between the power supply input end and the second control end, so as to control the on/off of the second switch Q2 by controlling the voltage of the second control end.

Further, the second switch control module enables the voltage of the second control end to be at another predetermined ratio to the input voltage of the power supply input end. In this case, the second switch control module may comprise a third voltage division resistor R8 and a fourth voltage division resistor R9 connected in series, and the third voltage division resistor R8 and the fourth voltage division resistor R9 are connected in series with the power supply input end. The second control end is connected to a second node N2 between the third voltage division resistor R8 and the fourth voltage division resistor R9, so that the voltage of the second control end is at another predetermined ratio to the input voltage of the power supply input end.

Therefore, the voltage at the second node N2 may be adaptively controlled according to the input voltage of the power supply input end, so that the on/off state of the second switch Q2 may be adaptively controlled. When the on/off states of the first switch M2 and the second switch Q2 are controlled, the voltage of the dummy load control end g1 can be controlled, thereby adaptively controlling the on/off of the dummy load module 220.

Further, the dummy load module 220 in the dummy load circuit 200 according to embodiments of the present application comprises: a dummy load R1 and a dummy load switch M1. The dummy load R1 and the dummy load switch M1 are connected in series with the power supply input end. The dummy load control end g1 is a switch control end of the dummy load switch M1.

In the present application, the dummy load switch M1 may be a triode or an MOS transistor. For example, the dummy load switch M1 may be an MOS transistor same as the first switch M2, preferably an NMOS transistor. Similarly, the dummy load switch M1 may be turned on when the voltage of the dummy load control end g1 is greater than a dummy load turn-on voltage Vg of the dummy load switch M1, and may be turned off when the voltage of the dummy load control end g1 is less than the dummy load turn-on voltage Vg.

Note that the constant voltage V' supplied by the constant voltage source V0 to the dummy load control end g1 via a drive resistor R2 is greater than the dummy load turn-on voltage Vg.

Next, the on/off situations of circuit elements in the dummy load circuit 200 when the power supply input end is not connected to the triac dimmer U1 and is connected to the triac dimmer U1 are described with reference to FIGS. 6 and 7.

Figure 7:
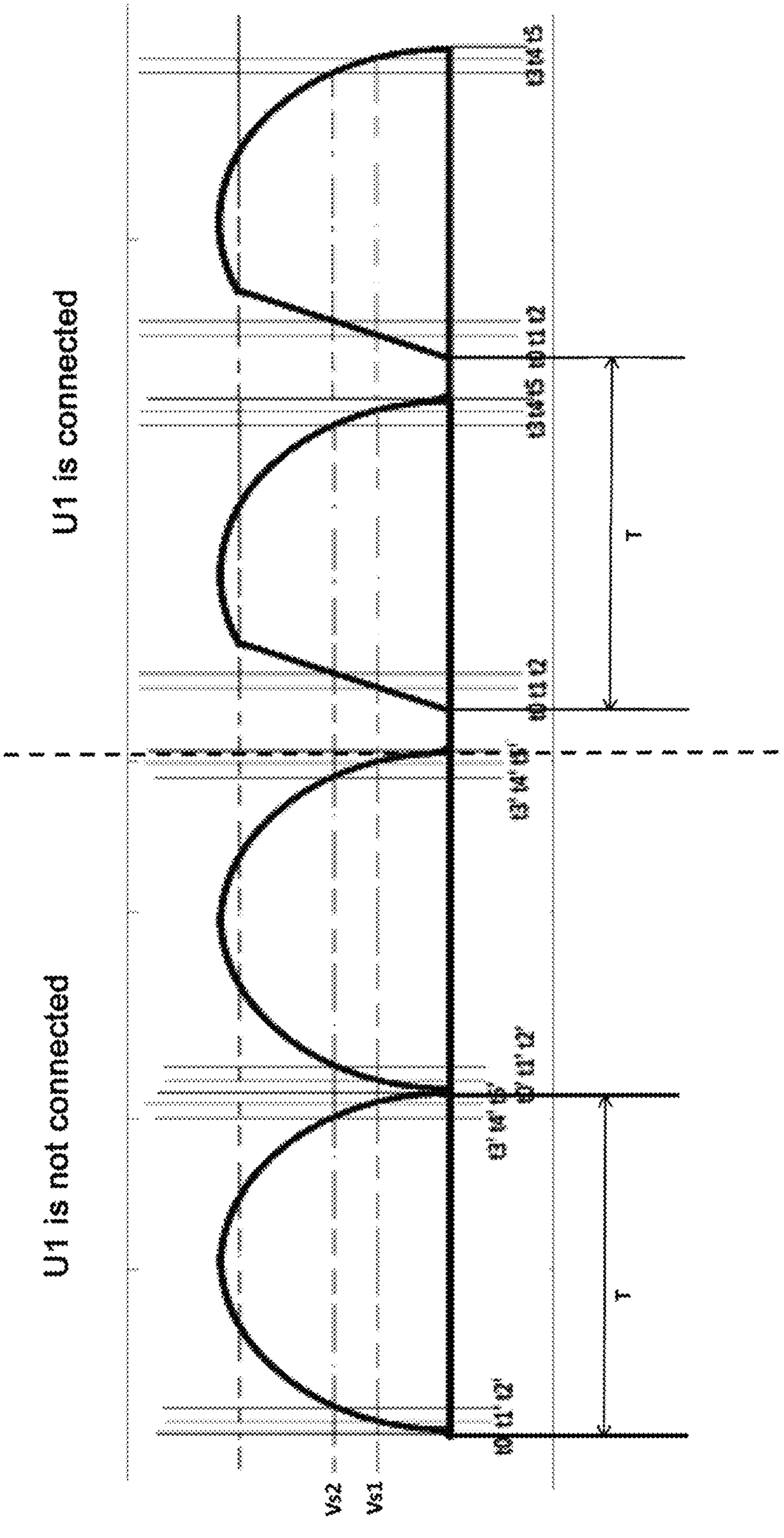
FIG. 7 is a schematic diagram showing power supply voltages inputted at different timings within one period of an input voltage when a power supply input end is connected to a triac dimmer and when the power supply input end is not connected to a triac dimmer, respectively.

FIG. 7 is a schematic diagram showing input voltages VAC at different timings within one period T of an input voltage when a power supply input end is connected to a triac dimmer and when the power supply input end is not connected to the triac dimmer, respectively. Assuming that the first switch M2 is an MOS transistor, and the second switch Q2, third switch Q3 and the fourth switch Q4 are all the same triodes, then V4=V3=V2. At this time, the on/off situations of circuit elements corresponding to different timings are as shown in Table 1 below.

TABLE 1

On/off situations of circuit elements corresponding to different timings within one period T

| | | | | | First switch circuit 211 | | | | Second switch circuit 212 | | Dummy load module 220 | | |
|---|---|---|---|---|---|---|---|---|---|---|---|---|---|
| | t | $V_{AC}$ | $V_{N1}$ | Q4 | Q3 | Cl | $V_{C1}$ | M2 | $V_{N2}$ | Q2 | Vg1 | M1 | $I_{R1}$ |
| A triac dimmer is not connected | t0' to t1' | <Vs1 | <V2 | Off | On | Discharge | >V1 | On | <V2 | Off | 0, low | Off | No |
| | t1' to t2' | Vs1 to Vs2 | <V2 | Off | On | Discharge | >V1 | On | ≥V2 | On | 0, low | Off | No |
| | t2' to t3' | ≥Vs2 | ≥V2 | On | Off | Charge | >V1 | On | >V2 | On | 0, low | Off | No |
| | t3' to t4' | Vs2 to Vs1 | <V2 | Off | On | Discharge | >V1 | On | ≥V2 | On | 0, low | Off | No |
| | t4' to t5' | <Vs1 | <V2 | Off | On | Discharge | >V1 | On | <V2 | Off | 0, low | Off | No |
| A triac dimmer is connected | t0 to t1 | <Vs1 | <V2 | Off | On | Discharge | <V1 | Off | <V2 | Off | V', high | On | Yes |
| | t1 to t2 | Vs1 to Vs2 | <V2 | Off | On | Discharge | <V1 | Off | ≥V2 | On | 0, low | Off | No |
| | t2 to t3 | ≥Vs2 | ≥V2 | On | Off | Charge | <V1 | Off | >V2 | On | 0, low | Off | No |
| | t3 to t4 | Vs2 to Vs1 | <V2 | Off | On | Discharge | <V1 | Off | ≥V2 | On | 0, low | Off | No |
| | t4 to t5 | <Vs1 | <V2 | Off | On | Discharge | <V1 | Off | <V2 | Off | V', high | On | Yes |
| | t5 to t0 | 0 | 0 | Off | On | Discharge | <V1 | Off | 0 | Off | V', high | On | No |

The input voltage when the power supply input end is connected to the triac dimmer and the input voltage when the power supply input end is not connected to the triac dimmer have the same period T, as shown in FIG. 7.

The voltage $V_{N1}$ at the first node N1 is at a predetermined ratio to the input voltage $V_{AC}$ of the power supply input end, and the voltage $V_{N2}$ at the second node N2 is at another predetermined ratio to the input voltage $V_{AC}$ of the power supply input end; and thus it is assumed that the voltage $V_{N2}$ at the second node N2 is equal to V2 when the input voltage $V_{AC}$ is equal to the first power supply voltage Vs1, and that the voltage $V_{N1}$ at the first node N1 is equal to V2 when the input voltage $V_{AC}$ is equal to the second power supply voltage Vs2, and Vs2>Vs1, as shown in FIG. 7.

In the case where the power supply input end is not connected to the triac dimmer U1, as shown in the left half part of FIG. 7, within a period T of t0' to t5': during t=t0' to t1' and before reaching t1', $V_{AC}$ increases from 0 to Vs1, and $V_{AC}<Vs1$, such that $V_{N2}<V2$ and $V_{N1}<V2$, and thus the second switch Q2 is turned off and the fourth switch Q4 is turned off. The turning off of the fourth switch Q4 causes the third switch Q3 to be turned on, so that the capacitor C1 discharges. However, after charging/discharging in multiple periods T, the voltage $V_{C1}$ at one end N0 of the capacitor C1 at the time t=t0' in a steady state is at a high level greater than V1. The discharge time of the capacitor C1 is short, and thus even if after discharging in a time period of t0' to t1', the voltage $V_{C1}$ of the capacitor C1 is still greater than V1, causing the first switch M2 to be turned on. As the first switch M2 is turned on, the dummy load control end g1 is grounded, so that the voltage Vg1 of the dummy load control end g1 is 0, and the dummy load switch M1 is turned off, so that a current $I_{R1}$ flowing through the dummy load R1 is 0.

At t=t1', $V_{AC}$=Vs1, such that $V_{N2}$=V2 and $V_{N1}$<V2. At this time, the second switch Q2 becomes turned on, but the fourth switch Q4 remains turned off. During t=t1' to t2' and before reaching t2', the input voltage $V_{AC}$ is between Vs2 and Vs1, such that $V_{N2}$>V2 and $V_{N1}$<V2. At this time, the second switch Q2 is turned on, and the fourth switch Q4 is turned off. The turning off of the fourth switch Q4 causes the capacitor C1 to continue to discharge during t1' to t2'. However, similarly, the time period of t1' to t2' is short, that is, the discharge time of the capacitor C1 is short, and after charging/discharging in multiple periods, the voltage $V_{C1}$ of the capacitor C1 at t=t0' is greater than V1, and thus after discharging during t0' to t1' and t1' to t2', the voltage $V_{C1}$ of the capacitor C1 is still greater than V1, causing the first switch M2 to be turned on. Both the first switch M2 and the second switch Q2 are turned on, and thus the voltage Vg1 of the dummy load control end g1 is 0, the dummy load switch M1 is turned off, and still no current flows through the dummy load R1.

At t=t2', $V_{AC}$=Vs2, such that $V_{N2}$>V2 and $V_{N1}$=V2. At this time, the second switch Q2 remains turned on, and meanwhile the fourth switch Q4 changes from turning off to turning on. The turning on of the fourth switch Q4 causes the third switch Q3 to be turned off, such that at this time, the capacitor C1 changes from the discharge state to a charge state. After t passes by t2' and until t3', $V_{AC}$≥Vs2, so that the capacitor C1 continues to be charged, $V_{C1}$>V1, causing the first switch M2 to be turned on. Both the first switch M2 and the second switch Q2 are turned on, and thus no current flows through the dummy load R1.

After t passes by t3' and until t4', Vs1≤$V_{AC}$<Vs2, such that $V_{N2}$≥V2 and $V_{N1}$<V2. At this time, the second switch Q2 remains turned on, but the fourth switch Q4 becomes turned off. The turning off of the fourth switch Q4 causes the capacitor C1 to change to a discharge state; however, due to a short discharge time, $V_{C1}$ during discharging is still greater than V1, causing the first switch M2 to be turned on. Both the first switch M2 and the second switch Q2 are turned on, and thus no current flows through the dummy load R1.

After t passes by t4', $V_{AC}$<Vs1 such that $V_{N2}$<V2 and $V_{N1}$<V2, and thus the second switch Q2 is turned off and the fourth switch Q4 is turned off. The turning off of the fourth switch Q4 causes the capacitor C1 to change to a discharge state; however, $V_{C1}$ during discharging is still greater than V1, causing the first switch M2 to be turned on. As the first switch M2 is turned on, still no current flows through the dummy load R1.

It can be determined that within a period T of t0' to t5': t0' to t2' and t3' to t5' are discharging time periods of the capacitor C1, and t2' to t3' is a charging time period of the capacitor C1. The maximum value of $V_{C1}$ is located at t3', and the minimum value of $V_{C1}$ is located at t2'. When the period T of the input voltage and the second turn-on voltage V2 are constant, the values of t2' and t3' depend on the values of the first voltage division resistor R6 and the second voltage division resistor R7. In addition, the charge/discharge rate of the capacitor C1 depends on the values of the capacitance of the capacitor C1, the charge resistor R3 and the discharge resistor R5. Therefore, using appropriate values of C1, R3, R5, R6 and R7 to set appropriate values of t2' and t3' and the charge/discharge rate of the capacitor C1, for example, a fast discharge rate and a slow charge rate, while the charging time period is much longer than the discharging time period, the voltage $V_{C1}$ of the capacitor C1 can be always greater than the first turn-on voltage V1. In other words, within one period T, even after the discharge of capacitor C1 during the discharging time period, the voltage $V_{C1}$ of the capacitor C1 can be still greater than the first turn-on voltage V1.

Therefore, based on the dummy load control circuit 210 and the dummy load circuit 200 according to the embodiments of the present application, when the power supply input end is not connected to the triac dimmer, the dummy load module 220 can be automatically disconnected from the power supply input end, so that no current flows through the dummy load R1. Therefore, when the power supply input end is not connected to the triac dimmer, no power is consumed on the dummy load R1. Thus, when the LED lamp 300 is turned off, the lighting device 100 according to the present application does not generate a standby power due to the presence of the dummy load R1, that is, the standby power of the lighting device 100 can be reduced.

Next, the situation in which the power supply input end is connected to the triac dimmer U1 is described.

In the case where the power supply input end is connected to the triac dimmer U1, as shown in the right half part of FIG. 7, the input voltage $V_{AC}$ after rectification is presented as a phase-cut AC half-wave. At this time, the period of the input voltage $V_{AC}$ is also T. For convenience of description, the time period from t0 to the next t0 is described as a period T, but it should be understood that the period from t5 to the next t5 is also a period T.

During t=t0 to t1 and before reaching t1, $V_{AC}$ is less than Vs1, such that $V_{N2}$<V2 and $V_{N1}$<V2. Thus, the second switch Q2 is turned off, and the fourth switch Q4 is turned off. The turning off of the fourth switch Q4 causes the capacitor C1 to discharge. As the voltage $V_{C1}$ of the capacitor C1 in a steady state is less than V1, the voltage $V_{C1}$ during discharging remains less than V1, causing the first switch M2 to be turned off. As the first switch M2 and the second switch Q2 are both turned off, the voltage Vg1 of the dummy load control end g1 is the constant voltage V' provided by the constant voltage source V0. As the constant voltage V' is greater than the turn-on voltage Vg of the dummy load switch M1, at this time, the dummy load switch M1 is turned on, and the current $I_{R1}$ flowing through the dummy load R1 is greater than 0.

At t=t1, $V_{AC}$=Vs1, such that $V_{N2}$=V2 and $V_{N1}$<V2. Therefore, the fourth switch Q4 remains turned off, but the second switch Q2 becomes turned on. The turning off of the fourth switch Q4 causes the capacitor C1 to continue to discharge, and therefore the voltage $V_{C1}$ is still less than V1, causing the first switch M2 to be turned off. However, as the second switch Q2 is turned on, the voltage Vg1 of the dummy load control end g1 becomes zero, and the dummy load switch M1 is turned off. As the dummy load switch M1 is turned off, no current flows through the dummy load R1.

After t passes by t1 and before reaching t2, Vs1<$V_{AC}$<Vs2, such that $V_{N2}$>V2 and $V_{N1}$<V2. Therefore, the fourth switch Q4 is turned off, but the second switch Q2 is turned on. The turning off of the fourth switch Q4 causes the capacitor C1 to continue to discharge, and therefore the voltage $V_{C1}$ is still less than V1, causing the first switch M2 to be turned off. However, as the second switch Q2 is turned on, the voltage Vg1 of the dummy load control end g1 becomes 0, and thus no current flows through the dummy load R1.

At t=t2, $V_{AC}$=Vs2, such that $V_{N2}$>V2 and $V_{N1}$=V2. Therefore, the second switch Q2 remains turned on, and meanwhile the fourth switch Q4 becomes turned on. The turning on of the fourth switch Q4 causes the third switch Q3 to be turned off, so that the capacitor C1 starts to be charged. After t passes by t2 and until reaching t3, $V_{AC}$≥Vs2, such that $V_{N2}$>V2 and $V_{N1}$≥V2. Therefore, the second switch Q2 is turned on, and the fourth switch Q is turned on. The turning on of the fourth switch Q4 causes the third switch Q3 to be turned off, and thus during this time period, the capacitor C1 continues to be charged. However, as the charge rate of the capacitor C1 is small, even after being charged during t2 to t3, the voltage $V_{C1}$ of the capacitor C1 is still less than V1, causing the first switch M2 to be turned off. However, as the second switch Q2 is turned on, the dummy load switch M1 is turned off, no current flows through the dummy load R1.

After t passes by t3 and until reaching t4, Vs1≤$V_{AC}$<Vs2, such that $V_{N2}$≥V2 and $V_{N1}$<V2. Therefore, the fourth switch Q4 is turned off, but the second switch Q2 is turned on. At this time, the capacitor C1 is in a discharge state. As $V_{C1}$ of the capacitor C1 is still less than V1 after the charging in the above, and thus the voltage $V_{C1}$ of the capacitor C1 remains less than V1 during discharging, causing the first switch M2 to be turned off. However, as the second switch Q2 is turned on, no current flows through the dummy load R1.

After t passes by t4 and before reaching t5, 0<$V_{AC}$<Vs1, such that $V_{N2}$<V2 and $V_{N1}$<V2. Therefore, both the fourth switch Q4 and the second switch Q2 are turned off. At this time, the capacitor C1 continues to be in a discharge state. During discharging, the voltage $V_{C1}$ of the capacitor C1 remains less than V1, causing the first switch M2 to be turned off. As both the first switch M2 and the second switch Q2 are turned off, the voltage Vg1 of the dummy load control end g1 is the constant voltage V', so that the dummy load switch M1 is turned on. At this time, the current $I_{R1}$ flowing through the dummy load R1 is greater than 0.

At t=t5, $V_{AC}$=0, and thus both the fourth switch Q4 and the second switch Q2 are turned off, the capacitor C1 continues to be in a discharge state, and the first switch M2 is turned off. Therefore, at this time, the dummy load switch M1 is turned on, and a path is formed between the dummy load R1 and the power supply input end. However, as the input voltage $V_{AC}$=0, the current $I_{R1}$ on the dummy load R1 is also 0.

Similarly, after t passes by t5 and until reaching the next t0, $V_{AC}$ is always zero, and at this time, the capacitor C1 continues to be in the discharge state. Both the first switch M2 and the second switch Q2 are turned off, and thus the dummy load switch M1 is turned on. However, as $V_{AC}$=0, the current $I_{R1}$ on the dummy load R1 is also 0.

It can be determined that within a period T from t0 to the next t0: only during t0 to t1 and t4 to t5, a current $I_{R1}$ flows through the dummy load R1. t0 to t2 and t3 to t0 are discharging time periods of the capacitor C1, and t2 to t3 is a charging time period of the capacitor C1. The maximum value of $V_{C1}$ is located at t3, and the minimum value of $V_{C1}$ is located at t2. When the voltage is inputted at an alternating current of 60 Hz and the cut phase is 45 degrees, the time period during which the input voltage is zero from t5 to t0 lasts for at least 1 to 2 ms, and thus compared with the case where the power supply input end is not connected to the triac dimmer, the charging time period of the capacitor C1 is reduced by at least 1 to 2 ms in the case where the power supply input end is connected to the triac dimmer. Accordingly, the discharging time period of the capacitor C1 is increased by at least 1 to 2 ms.

Therefore, by using appropriate values of C1, R3, R5, R6 and R7 to set values of t2 and t3 and the charge/discharge rate of the capacitor C1, for example, a fast discharge rate and a slow charge rate, within one period T, even after charging during t2 to t3, the voltage $V_{C1}$ of the capacitor C1 is still less than the first turn-on voltage V1. That is, when the power supply input end is connected to the triac dimmer, the first switch M2 is always turned off.

In addition, using appropriate values of the third voltage division resistor R8 and the fourth voltage division resistor R9, the positions of t1 and t4 can be determined, so as to close to the position of a zero input voltage. Thus, a current can flow through the dummy load R1 only when the input voltage $V_{AC}$ passes by the vicinity of a zero-crossing point (i.e., when the input voltage $V_{AC}$ increases from 0 to Vs1 and decreases from Vs1 to 0).

In this way, based on the dummy load control circuit 210, the dummy load circuit 200, and the lighting device 100 comprising the same according to the embodiments of the present application, when the power supply input end is connected to the triac dimmer, the current $I_{R1}$ can flow through the dummy load R1 only when the input voltage $V_{AC}$ passes by the vicinity of the zero-crossing point. Therefore, a maintained current can be supplemented for the triac dimmer, so that the triac dimmer can work normally.

In the embodiments of the present application, for example, the dummy load R1 may be about 100Ω, the drive resistor R2 may be about several tens of kΩ, the charge resistor R3 may be in the order of MΩ, the resistors R4, R7, R9 may be about 100 kΩ, the discharge resistor R5 may be about several tens of kΩ, the resistors R6, R8 may be about several MΩ, and the capacitance of the capacitor C1 is in the order of μF, so as to achieve the desired dummy load control circuit 210 and dummy load circuit 200 in the present application.

With regard to an AC input voltage $V_{AC}$ with a period of T=8.3 ms and a maximum voltage value of about 170 V, in cases where the described resistor values are applied, when the turn-on voltages (i.e., the second turn-on voltage V2) of the fourth switch Q4 and the second switch Q2 are both 0.7 V, the second power supply voltage Vs2 corresponding to the second turn-on voltage V2 is about 39 V, and the first power supply voltage Vs1 is about 36 V.

Figure 8A:
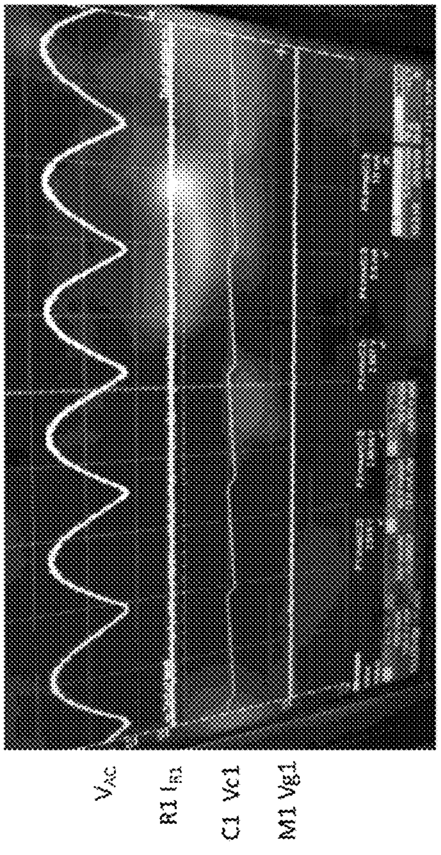
FIGS. 8A and 8B show waveforms of an input voltage $V_{AC}$, a current $I_{R1}$ on a dummy load R1, a voltage $V_{C1}$ of a capacitor C1, and a voltage Vg1 of a control end of a dummy load switch M1 measured when a power supply input end is connected to a triac dimmer and when the power supply input end is not connected to the triac dimmer, respectively.
Figure 8B:
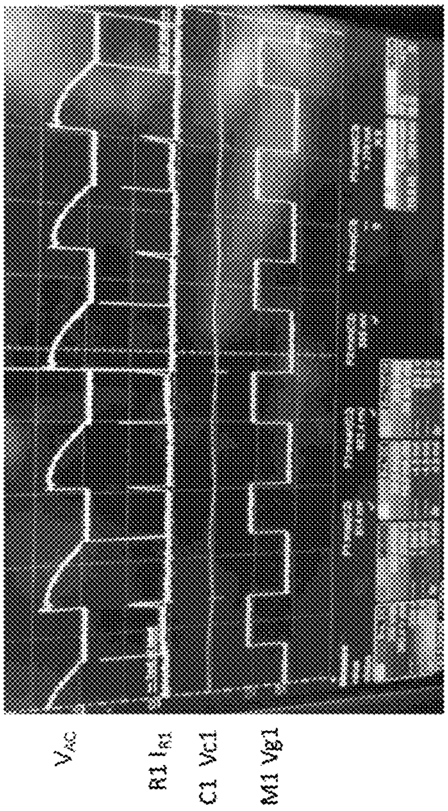

FIGS. 8A and 8B show waveforms of an input voltage $V_{AC}$ of a power supply input end, a current $I_{R1}$ on a dummy load R1, a voltage $V_{C1}$ at one end N0 of a capacitor C1, and a voltage Vg1 of a dummy load control end of a dummy load switch M1 measured when the power supply input end is connected to a triac dimmer and when the power supply input end is not connected to the triac dimmer, respectively. The waveforms shown in FIGS. 8A and 8B correspond to the dummy load control circuit 210, the dummy load circuit 200, and the lighting device 100 to which the described resistance values and capacitance value are applied.

FIG. 8A shows that when the power supply input end is not connected to the triac dimmer, the voltage $V_{C1}$ of the capacitor C1 is always greater than 2.8V (i.e., greater than the first turn-on voltage V1), so that the voltage Vg1 of the dummy load control end g1 of the dummy load switch M1 is equal to 0, and the current $I_{R1}$ on the dummy load R1 is equal to 0. FIG. 8B shows that when the power supply input end is connected to the triac dimmer, the voltage $V_{C1}$ of the capacitor C1 is between 0.4 V and 0.6 V (i.e., less than the first turn-on voltage V1), the voltage Vg1 of the dummy load control end g1 of the dummy load switch M1 is at a high level when the input voltage $V_{AC}$ is 0, and the current $I_{R1}$ on the dummy load R1 presents a non-zero pulse only when the input voltage $V_{AC}$ is near a zero-crossing point.

Therefore, based on the dummy load control circuit 210 and the dummy load circuit 200 according to the embodiments of the present application, when the power supply input end is connected to the triac dimmer, a current may flow through the dummy load R1 only when the input voltage $V_{AC}$ passes by the vicinity of the zero-crossing point; and the current on the dummy load R1 is always zero when the power supply input end is not connected to the triac dimmer, thereby achieving the object of the present application.

In the present application, standby powers when the LED lamp 300 is turned off, which are generated by the lighting device 100' according to the prior art when the power supply input end is not connected to the triac dimmer, and by the lighting device 100 comprising the exemplary dummy load circuit 200 as shown in FIGS. 4 to 6 according to the embodiments of the present application, are measured. Specifically, the lighting device 100' according to the prior art may generate a standby power of up to 0.89 W, while the standby power of the lighting device 100 according to the present application is reduced to 0.476 W, thereby achieving effective reduction of standby power.

Apparently, the described embodiments are merely a part rather than all of the embodiments of the present application. All other embodiments obtained by a person of ordinary skill in the art based on the embodiments of the present application without any inventive effort shall all fall within the scope of protection of the present application.

It should be noted that the terms used herein are for the purpose of describing particular embodiments only and are not intended to limit exemplary embodiments in accordance with the present application. As used herein, the singular form is intended to comprise the plural form as well, unless the context clearly indicates otherwise, and further it should be understood that the terms "comprises" and/or "comprising" when used in the present description, specify the presence of features, steps, operations, devices, components and/or combinations thereof.

It should be noted that the terms "first", "second" etc., in the description, claims, and accompanying drawings of the present application are used to distinguish similar objects, and are not necessarily used to describe a specific sequence or order. It should be understood that the data so used may be interchanged where appropriate, so that the embodiments of the present application described herein can be achieved in sequences other than those illustrated or described herein.

The described content merely relates to preferred embodiments of the present application and is not intended to limit the present application. For a person skilled in the art, the present application may have various modifications and variations. Any modifications, equivalent replacements, improvements, etc. made within the spirit and principle of the present application shall all belong to the scope of protection of the present application.

What we claim is:

1. A dummy load control circuit compatible with a triac dimmer, wherein the dummy load control circuit and a dummy load module are connected in parallel with a power supply input end, the dummy load module has a dummy load control end, and the dummy load control circuit comprises:

a first switch circuit, comprising a first switch and a first switch control module, wherein the first switch is controlled by the first switch control module, so that the first switch is turned off when the power supply input end is connected to a triac dimmer, and is turned on when the power supply input end is not connected to the triac dimmer;

a second switch circuit, comprising a second switch and a second switch control module controlling on/off of the second switch; and a constant voltage source, providing a constant voltage to the dummy load control end, wherein the dummy load module is turned on when the first switch and the second switch are turned off, and is turned off when the first switch and/or the second switch are turned on.

2. The dummy load control circuit according to claim 1, wherein the first switch control module comprises a capacitor, and a charge/discharge time of the capacitor is controlled by an input voltage of the power supply input end, and thus on/off of the first switch is controlled.

3. The dummy load control circuit according to claim 2, wherein the charge/discharge time of the capacitor is controlled by the input voltage of the power supply input end, so that a voltage at one end of the capacitor is less than a first turn-on voltage of the first switch when the power supply input end is connected to the triac dimmer, and is greater than the first turn-on voltage when the power supply input end is not connected to the triac dimmer, and thus the on/off of the first switch is controlled.

4. The dummy load control circuit according to claim 1, wherein the first switch comprises a first control end, the first switch is connected to the dummy load control end, and the first switch control module is connected between the power supply input end and the first control end, wherein the first switch is controlled by the first switch control module, so that the first switch is turned off when the power supply input end is connected to a triac dimmer, and is turned on when the power supply input end is not connected to the triac dimmer comprises:

a voltage of the first control end is controlled by the first switch control module, so that the voltage of the first control end is less than a first turn-on voltage of the first switch when the power supply input end is connected to the triac dimmer, and thus the first switch is turned off; and so that the voltage of the first control end is greater than the first turn-on voltage when the power supply input end is not connected to the triac dimmer, and thus the first switch is turned on.

5. The dummy load control circuit according to claim 4, wherein the first switch control module comprises a discharge module and a charge/discharge control module, wherein the discharge module comprises a charge/discharge control end, and the charge/discharge control module is connected between the power supply input end and the charge/discharge control end.

6. The dummy load control circuit according to claim 5, wherein the discharge module comprises a capacitor, a discharge resistor and a third switch, wherein one end of the capacitor is connected to the constant voltage source via a charge resistor to form a charge loop, the one end of the capacitor is connected to the third switch via the discharge resistor to form a discharge loop, and the one end of the capacitor is connected to the first control end of the first switch, and wherein the charge/discharge control end is a switch control end of the third switch.

7. The dummy load control circuit according to claim 6, wherein the voltage of the first control end is controlled by the first switch control module, so that the voltage of the first control end is less than the first turn-on voltage when the power supply input end is connected to the triac dimmer, and the voltage of the first control end is greater than the first turn-on voltage when the power supply input end is not connected to the triac dimmer comprises:

controlling, using the input voltage of the power input end, the voltage of the charge/discharge control end through the charge/discharge control module, so as to control on/off of the third switch, thereby controlling a charge/discharge time of the capacitor, so that the voltage at the one end of the capacitor is less than the first turn-on voltage when the power supply input end is connected to the triac dimmer, and is greater than the first turn-on voltage when the power supply input end is not connected to the triac dimmer, and wherein the capacitor is charged when the third switch is turned off, and discharges when the third switch is turned on.

8. The dummy load control circuit according to claim 7, wherein the charge/discharge control module comprises a fourth switch and a fourth switch control module, wherein the fourth switch comprises a fourth control end, the fourth switch is connected between the charge/discharge control end and the ground, and the fourth switch control module is connected between the power supply input end and the fourth control end, to control on/off of the fourth switch.

9. The dummy load control circuit according to claim 8, wherein controlling the voltage of the charge/discharge control end through the charge/discharge control module, so as to control the on/off of the third switch, thereby controlling the charge/discharge time of the capacitor comprises:

controlling, by the fourth switch control module, the on/off of the fourth switch, so as to control the voltage of the charge/discharge control end, thereby controlling the on/off of the third switch, and wherein the on/off state of the third switch is opposite to the on/off state of the fourth switch.

10. The dummy load control circuit according to claim 8, wherein the fourth switch control module comprises a first voltage division resistor and a second voltage division resistor connected in series, wherein the first voltage division resistor is connected to the power supply input end, and wherein the fourth control end is connected to a first node between the first voltage division resistor and the second voltage division resistor.

11. The dummy load control circuit according to claim 10, wherein controlling, using the input voltage of the power input end, the voltage of the charge/discharge control end through the charge/discharge control module, so as to control the on/off of the third switch, thereby controlling the charge/discharge time of the capacitor, so that the voltage at the one end of the capacitor is less than the first turn-on voltage when the power supply input end is connected to the triac dimmer, and is greater than the first turn-on voltage when the power supply input end is not connected to the triac dimmer comprises:

in response to the input voltage of the power supply input end after rectification being an AC half-wave with a period T when the power supply input end is not connected to the triac dimmer, within the period T: the capacitor is charged by the constant voltage source when the third switch is turned off, the capacitor discharges via the discharge resistor when the third switch is turned on, and the voltage at the one end of the capacitor is still greater than the first turn-on voltage after discharging; and in response to the input voltage of the power supply input end after rectification being a phase-cut AC half-wave with the period T when the power supply input end is connected to the triac dimmer, within the period T: the capacitor is charged via the constant voltage source when the third switch is turned off, the capacitor discharges via the discharge resistor when the third switch is turned on, and the voltage at the one end of the capacitor is still less than the first turn-on voltage after charging.

12. The dummy load control circuit according to claim 11, wherein the fourth switch is turned on when the voltage of the fourth control end is greater than a fourth turn-on voltage of the fourth switch, and is turned off when the voltage of the fourth control end is less than the fourth turn-on voltage, a time period during which the voltage at the first node is less than the fourth turn-on voltage corresponds to a turning-on time period of the third switch, and a time period during which the voltage at the first node is greater than the fourth turn-on voltage corresponds to a turning-off time period of the third switch.

13. The dummy load control circuit according to claim 8, wherein the first switch is an MOS transistor, and the second switch, the third switch and the fourth switch are triodes.

14. The dummy load control circuit according to claim 1, wherein the second switch comprises a second control end, the second switch is connected between the dummy load control end and the ground, and the second switch control module is connected between the power supply input end and the second control end.

15. The dummy load control circuit according to claim 14, wherein the second switch is turned on when the voltage of the second control end is greater than a second turn-on voltage of the second switch, and is turned off when the voltage of the second control end is less than the second turn-on voltage, and the second switch control module enables the voltage of the second control end to be at a predetermined ratio to an input voltage of the power supply input end.

16. The dummy load control circuit according to claim 15, wherein the second switch control module comprises a third voltage division resistor and a fourth voltage division resistor connected in series, wherein the third voltage division resistor is connected to the power supply input end, and wherein the second control end is connected to a second node between the third voltage division resistor and the fourth voltage division resistor, such that the voltage of the second control end is at the predetermined ratio to the input voltage of the power supply input end.

17. The dummy load control circuit according to claim 1, wherein the dummy load control end is at the constant voltage when the first switch and the second switch are turned off, so that the dummy load module is turned on; and the dummy load control end is grounded when the first switch and/or the second switch are turned on, so that the dummy load module is turned off.

18. Alighting device compatible with the triac dimmer, comprising:

the dummy load control circuit according to claim 1;

the dummy load module, connected to the power supply input end and having the dummy load control end; and a light-emitting module, the light-emitting module and the dummy load module being connected in parallel with the power supply input end and the light-emitting module emitting light according to an input voltage of the power supply input end;

wherein the dummy load control circuit is connected between the power supply input end and the dummy load control end, so that: the dummy load module is turned on when the power supply input end is connected to a triac dimmer and the input voltage of the power supply input end is between a zero voltage and a predetermined first power supply voltage, and the dummy load module is turned off when the power supply input end is not connected to the triac dimmer.

19. A dummy load control method compatible with a triac dimmer, wherein a dummy load module for the triac dimmer and a dummy load control circuit comprising a capacitor are connected to a power supply input end, and the dummy load control method comprises:

in response to an input voltage of the power supply input end after rectification being an AC half-wave with a period of T when the power supply input end is not connected to the triac dimmer, and the input voltage after rectification being a phase-cut AC half-wave with the period T when the power supply input end is connected to the triac dimmer, and within the period T, a time period during which the voltage is a zero voltage in the phase-cut AC half-wave being longer than a time period during which the voltage is the zero voltage in the AC half-wave by at least a predetermined time interval, controlling, using the input voltage of the power supply input end, charge/discharge time of the capacitor, so that: the voltage at one end of the capacitor is less than a first turn-on voltage when the power supply input end is connected to the triac dimmer, thereby enabling the dummy load module to be turned on when the power supply input end is connected to the triac dimmer and the input voltage of the power supply input end is between the zero voltage and a predetermined first power supply voltage; and the voltage at the one end of the capacitor is greater than the first turn-on voltage when the power supply input end is not connected to the triac dimmer, thereby enabling the dummy load module to be turned off when the power supply input end is not connected to the triac dimmer, and wherein the first turn-on voltage is less than the first power supply voltage.

20. The dummy load control method according to claim 19, wherein the dummy load module has a dummy load control end, wherein a constant voltage source provides a constant voltage to the dummy load control end, the dummy load control circuit comprises a first switch and a second switch, the first turn-on voltage is a threshold turn-on voltage of the first switch, and the dummy load module is turned on when the first switch and the second switch are turned off, and is turned off when the first switch and/or the second switch are turned on, wherein the dummy load control method further comprises:

controlling the second switch by using the input voltage of the power supply input end, so that the second switch is turned on when the input voltage is greater than the first power supply voltage, and is turned off when the input voltage is less than the first power supply voltage.

21. The dummy load control method according to claim 20, wherein the voltage at one end of the capacitor being less than a first turn-on voltage when the power supply input end is connected to the triac dimmer, thereby enabling the dummy load module to be turned on when the power supply input end is connected to the triac dimmer and the input voltage of the power supply input end is between the zero voltage and a predetermined first power supply voltage comprises:

the voltage at the one end of the capacitor being less than the first turn-on voltage of the first switch when the power supply input end is connected to the triac dimmer, so that the first switch is turned off, the second switch being turned off when the input voltage of the power supply input end is between the zero voltage and the first power supply voltage, and the first switch and the second switch being both turned off, so that the dummy load module is turned on; and the voltage at the one end of the capacitor is greater than the first turn-on voltage when the power supply input end is not connected to the triac dimmer, thereby enabling the dummy load module to be turned off when the power supply input end is not connected to the triac dimmer comprises:

the voltage at the one end of the capacitor being greater than the first turn-on voltage of the first switch when the power supply input end is not connected to the triac dimmer, so that the first switch is turned on, and the first switch being turned on, so that the dummy load module is turned off.

22. The dummy load control method according to claim 19, wherein within the period T, the capacitor continuously discharges when the input voltage is in a range from the zero voltage to a second power supply voltage (Vs2), and the capacitor continuously being charged when the input voltage is out of the range from the zero voltage to the second power supply voltage, wherein the second power supply voltage is greater than the first power supply voltage.

23. The dummy load control method according to claim 22, wherein a charge/discharge rate of the capacitor is set so that within the period T:

when a time period during which the input voltage is in the range from the zero voltage to the second power supply voltage is less than a predetermined time period, after the capacitor discharges in the time period during which the input voltage is in the range from the zero voltage to the second power supply voltage, the voltage of the capacitor is still greater than the first turn-on voltage; and when a time period during which the input voltage is in the range from the zero voltage to the second power supply voltage is greater than the predetermined time period, after the capacitor is charged in a time period during which the input voltage is out of the range from the zero voltage to the second power supply voltage, the voltage of the capacitor is still less than the first turn-on voltage, wherein within the period T, a time period during which the voltage is the zero voltage in the phase-cut AC half-wave is longer than a time period during which the voltage is the zero voltage in the AC half-wave by at least the predetermined time interval, so that the time period during which the input voltage is in the range from the zero voltage to the second power supply voltage when the power supply input end is not connected to the triac dimmer is less than the predetermined time period, and the time period during which the input voltage is in the range from the zero voltage to the second power supply voltage when the power supply input end is connected to the triac dimmer is longer than the predetermined time period.

* * * * *